(12) United States Patent
Srikrishna

(10) Patent No.: US 7,706,285 B2
(45) Date of Patent: *Apr. 27, 2010

(54) METHOD AND APPARATUS FOR MONITORING AND DISPLAYING ROUTING METRICS OF A NETWORK

(75) Inventor: Devabhaktuni Srikrishna, San Mateo, CA (US)

(73) Assignee: Tropos Networks, Inc., Sunnyvale, CA (US)

( * ) Notice: Subject to any disclaimer, the term of this patent is extended or adjusted under 35 U.S.C. 154(b) by 143 days.

This patent is subject to a terminal disclaimer.

(21) Appl. No.: 12/077,368

(22) Filed: Mar. 18, 2008

(65) Prior Publication Data

US 2008/0225730 A1 Sep. 18, 2008

Related U.S. Application Data

(63) Continuation of application No. 10/640,717, filed on Aug. 13, 2003, now Pat. No. 7,376,087.

(51) Int. Cl.
H04L 12/26 (2006.01)
H04L 12/28 (2006.01)

(52) U.S. Cl. .................. 370/238; 370/252; 370/400

(58) Field of Classification Search ............... 370/238, 370/241, 248, 250, 252, 254–256, 389, 400, 370/401

See application file for complete search history.

(56) References Cited

U.S. PATENT DOCUMENTS

| | | | |
|---|---|---|---|
| 5,563,881 A | 10/1996 | Perelman et al. | |
| 5,740,366 A | 4/1998 | Mahany et al. | |
| 6,298,053 B1 | 10/2001 | Flammer, III et al. | |
| 6,487,604 B1 | 11/2002 | Rochford et al. | |
| 6,704,301 B2 | 3/2004 | Chari et al. | |
| 6,791,949 B1* | 9/2004 | Ryu et al. | 370/254 |
| 6,965,575 B2 | 11/2005 | Srikrishna et al. | |
| 7,221,646 B2* | 5/2007 | Kawano et al. | 370/218 |
| 2002/0163889 A1* | 11/2002 | Yemini et al. | 370/238 |
| 2004/0233855 A1* | 11/2004 | Gutierrez et al. | 370/252 |
| 2004/0252643 A1* | 12/2004 | Joshi | 370/238 |

* cited by examiner

*Primary Examiner*—Hong Cho
(74) *Attorney, Agent, or Firm*—Brian R. Short (57) ABSTRACT

The invention includes an apparatus and method for displaying path metrics associate with nodes and links within a network. The method includes determining path metric values associated with the network. The method further includes displaying only the path metric values that fall within a predetermined set. The predetermined set can be adjustable by a network manager. The predetermined set can include an initial default value and be additionally adjusted by a network manager. The predetermined set associated with a particular node can be based upon a redundancy of paths available to the particular node.

19 Claims, 5 Drawing Sheets

METHOD AND APPARATUS FOR MONITORING AND DISPLAYING ROUTING METRICS OF A NETWORK

RELATED APPLICATIONS

This patent application is a continuation of U.S. patent application Ser. No. 10/640,717, filed Aug. 8, 2003, which granted as U.S. Pat. No. 7,376,087, on May 20, 2008.

FIELD OF THE INVENTION

The invention relates generally to networking. More particularly, the invention relates to a method and apparatus for monitoring and displaying routing metrics of a network.

BACKGROUND OF THE INVENTION

Packet networking is a form of data communication in which data packets are routed from a source device to a destination device. Packets can be networked directly between a source node and a destination node, or the packets can be relayed through a number of intermediate nodes.

A wireless network can include a wireless device being connected to a network through a base station that is wired to the network. The wireless device can transmit data packets that are received by the base station and then routed through the network. The wireless network can include many base stations that are each wired to the network.

Wireless mesh networks can include many different wireless routing paths between access nodes of the mesh networks. The quality of the routing paths can vary greatly between access nodes of the mesh networks. Additionally, the quality of the routing paths can vary over time as transmission characteristics of the routing wireless paths vary over time.

A network manager could utilize wireless routing path information to determine desirable network configurations. Network configurations can include physical placements of the nodes, and the number of nodes included within the network.

It is desirable to have a wireless mesh network that can continually analyze the quality of routing paths through the wireless mesh network and conveys the quality of the routing paths to a network manager. Additionally, it is desirable that the network be able to provide suggestions to the network manager regarding configurations of the network.

SUMMARY OF THE INVENTION

The invention includes an apparatus and method for analyzing the quality of routing paths through a wireless mesh network, and conveying the quality of the routing paths to a network manager. Additionally, the network is able to provide suggestions to the network manager regarding configurations of the network.

An embodiment includes a method of displaying path metrics associate with nodes and links within a network. The method includes determining path metric values associated with the network. The method further includes displaying only the path metric values that fall within a predetermined set. The predetermined set can be adjustable by a network manager. The predetermined set can include an initial default value and be additionally adjusted by a network manager. The predetermined set associated with a particular node can be based upon a redundancy of paths available to the particular node.

Another embodiment further includes displaying a representation of a redundancy of paths associated each node. This can include displaying the redundancy representation of only nodes having a threshold number of redundant paths.

An embodiment includes determining path metric values associated with the network by determining a success ratio of a number routing packets successfully received at a node, versus a number of transmitted routing packets over a period of time T1, for each wireless route to the node. Another embodiment includes determining path metric values associated with the network by further determining a success long ratio of a number of routing packets successfully received by a node versus a number of transmitted routing packets over a period of time T2, wherein T2 is substantially greater than T1, for each node. Another embodiment includes determining path metric values associated with each node of the network by determining a throughput, for each node.

Other aspects and advantages of the present invention will become apparent from the following detailed description, taken in conjunction with the accompanying drawings, illustrating by way of example the principles of the invention.

DETAILED DESCRIPTION

As shown in the drawings for purposes of illustration, the invention is embodied in an apparatus and method for determining the quality of routing paths through a wireless mesh network, and conveying the quality of the routing paths to a network manager. Additionally, the network is able to provide suggestions to the network manager regarding configurations of the network.

A Mesh Network

Figure 1:
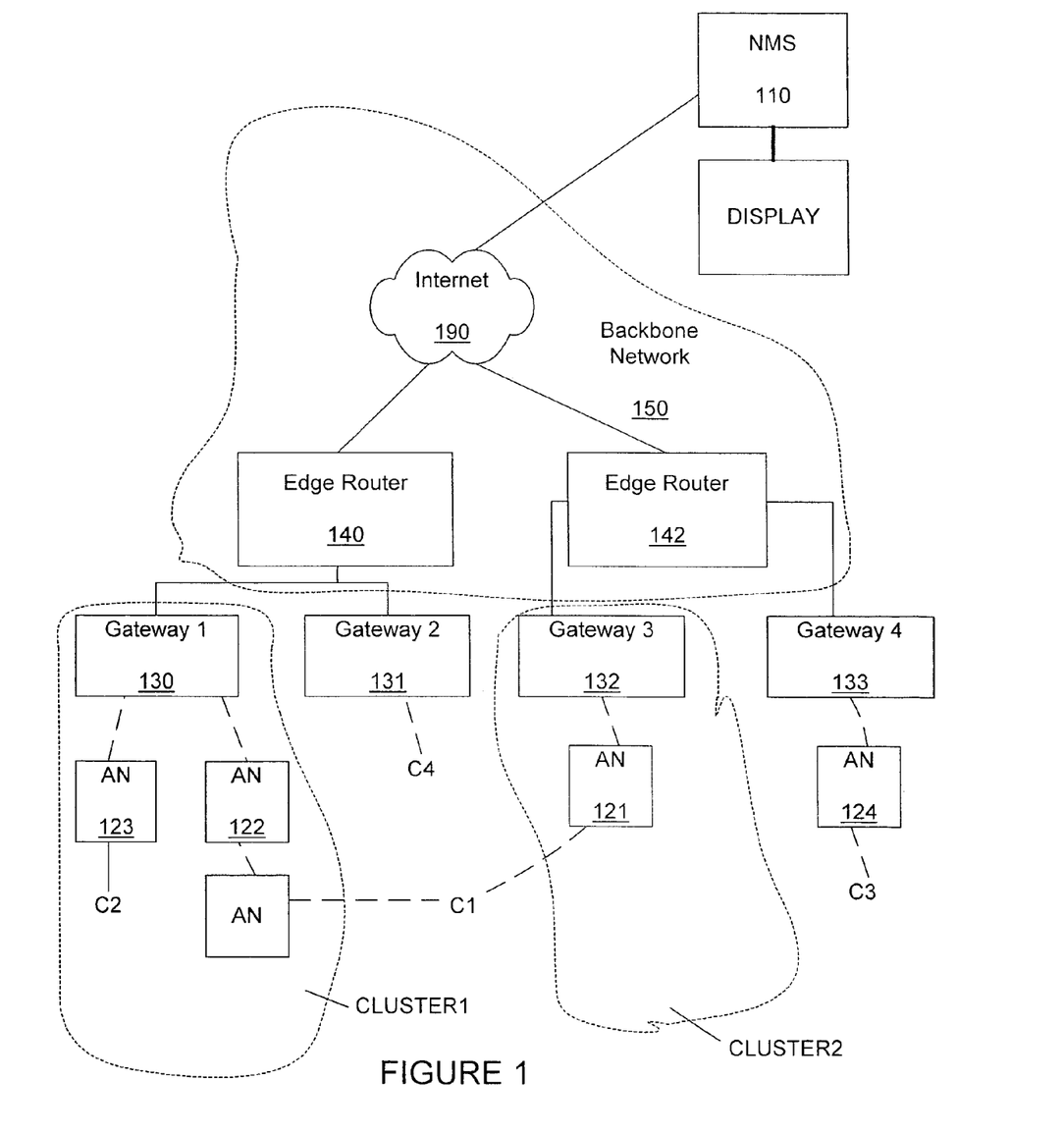
FIG. 1 shows a wireless network that can include a network management system according to embodiments of the invention.

FIG. 1 shows a wireless network that can include a network management system (NMS) according to embodiments of the invention.

The NMS 110 provides management of a wireless mesh network. The NMS 110 can provide network management, address management, monitoring, performance tracking, configuration management and security functions.

An embodiment of the present invention includes the NMS 110 providing a visual display of the quality of routing paths between gateways and wireless access nodes of the network. The display can provide a network manager with information that can be useful for improving the configuration of the network.

The wireless mesh network as shown in FIG. 1 includes a first gateway 130, a second gateway 131, a third gateway 132 and a fourth gateway 133. Generally, the gateways 130, 131, 132, 133 are connected through wires to a first edge router 140 and a second edge router 142 of a backbone network 150. The edge routers 140, 141 provide wired connections to an internet network 190.

As previously described, the gateways 130, 131, 132, 133 belong to a wireless mesh network. The wireless mesh network can additionally include many wireless access nodes, such as, first and second access nodes 120, 121. The wireless mesh network can additionally include a third access node 122, a fourth access node 123 and a fifth access node 124.

As shown in FIG. 1, the third and fourth access nodes 122, 123 are wirelessly connected to the first gateway 130. The single wireless link between the first gateway 130 and the third and fourth access nodes 122, 123 can be designated as a single hop. The first access node 120 is wirelessly connected to the third access node 122. The double wireless link between the first gateway 130 and the first access node 120 can be designated as a double hop.

The connections or links between access nodes, and between access nodes and other devices can be either wired or wireless.

The access nodes and devices of a gateway can define a cluster. For example, a first cluster (CLUSTER1) of FIG. 1 includes first gateway 130, the first, third and fourth access nodes 120, 122, 123. A second client C2 can be connected to the first cluster through the fourth access node 123, third and fourth clients C3, C4 can be connected to the first cluster through the first hub 160.

A second cluster (CLUSTER2) can include the third gateway 132, the second access node 121.

A third cluster can include the second gateway 131 that is wirelessly connected to a fourth client C4.

A fourth cluster can include the fourth gateway 133 that is wirelessly connected to a fifth access node 124. The fifth access node 124 can be wirelessly connected to a third client C3.

A client generally can include a laptop computer, a personal digital assistant (PDA), a cell-phone, or any other device that includes as interface card adaptable for use with the mesh network of the invention.

An access node generally includes any point of attachment of a client with the mesh network. The access node can be a wireless access point, a wired access point, a router, a hub, a gateway, or any other networking device capable of attachment to a client.

A downlink interface is a network interface (logical or physical) that attaches an access node to a client device. An access node can have more that one downlink interface.

A gateway is a network entity that maintains an address mapping table for each client. As will be described, the address mapping table generally includes a MAC-IP address mapping for the client devices. A single gateway corresponds with each access node. However, each gateway can service several access nodes.

A cluster is defined as a set of access nodes that are serviced by a single gateway.

A gateway can be an access node. In this case, the gateway generally includes one or many more downlink interfaces. An embodiment includes the gateway being an edge router between wired and wireless networks. This embodiment generally includes the gateway being at a cluster boundary. Here, the cluster is defined as the maximal set of access nodes and client devices serviced by the gateway.

A backbone network is generally defined as all network elements that are not a part of the access network.

An edge router is generally a network element that is directly connected to a gateway through a wired or wireless connection. The edge router is not a member of a cluster. The edge router implements routing logic to aid in the forwarding and routing of packets.

The internet is a global network connecting millions of computers, in which control of the network is decentralized. Generally, each internet computer is independent, and referred to as a host.

A Mesh Network Including Beacons

Each gateway periodically sends out a beacon to the access nodes. The access nodes then rebroadcast the beacon. This permits each access node to determine a path to the gateway. For one embodiment, a reverse beacon is sent by the access nodes back to the gateway. Thus, the gateway has a full path to each access node, and each access node has a path to its nearest neighbors (gateway or access nodes), and knows which of those paths leads to the gateway. Therefore, the access node and the gateway can communicate. For one embodiment, if an access node needs to be connected to the Internet via the gateway, the access node sends a request to the next access node upstream from the access node. The request of the access nodes requests that it be passed along to the gateway. The gateway is able to send a message to any access node as well.

For another embodiment, when an access node wishes to connect the gateway, it sends a connection request, through the known path to the gateway. This connection request includes the known path to the gateway. When the gateway receives the request, it becomes aware of the path to the requesting access node, as well as all intervening nodes. The gateway uses this information to respond to the request, and add the data to its routing table/access node tree.

Figure 2:
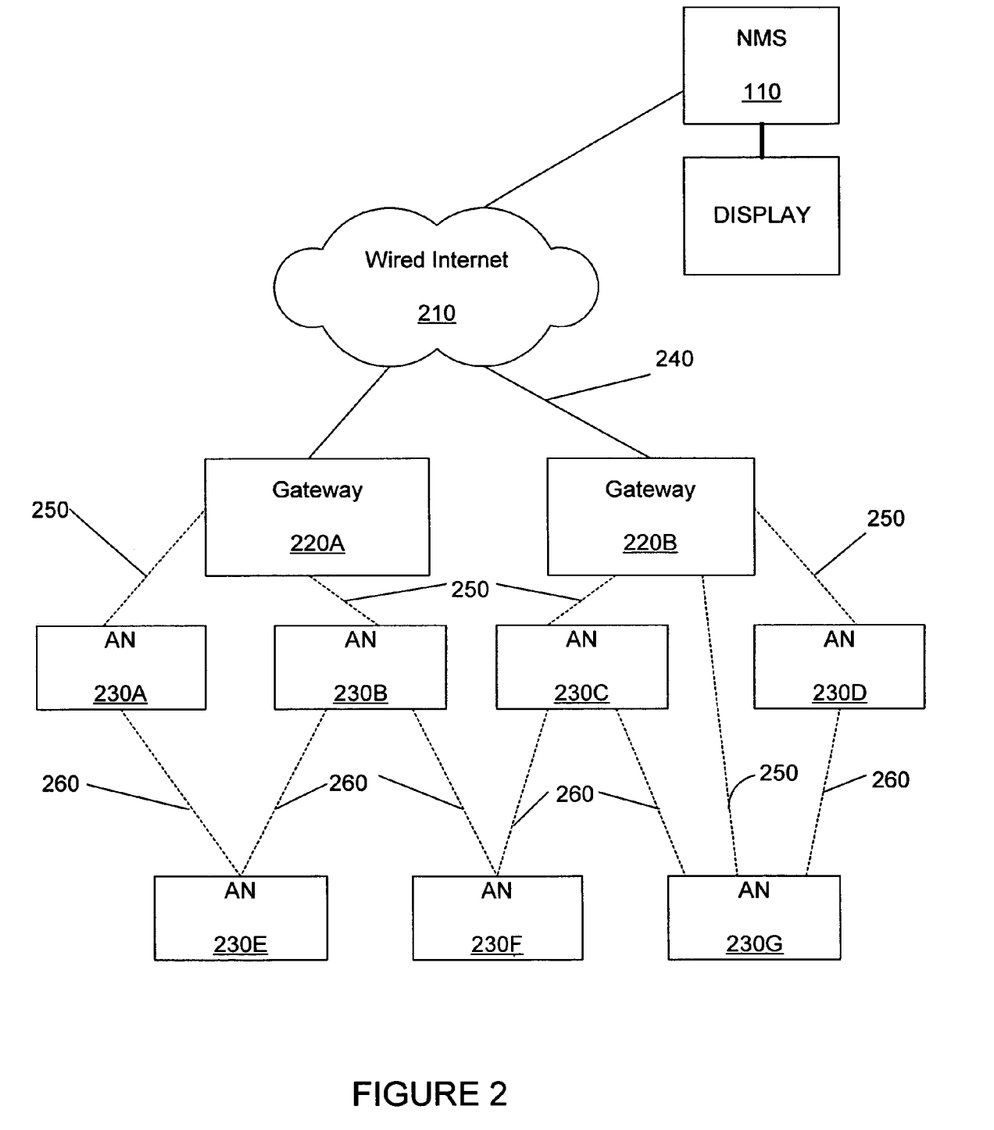
FIG. 2 shows another wireless network that can include a network management system according to embodiments of the invention.

FIG. 2 is a network diagram of one embodiment of a network connection structure. The wired network 210, for one embodiment is the Internet. Gateways 220A, 220B are coupled to the wired network 210, through a wired connection 240, for one embodiment. Alternatively, the gateways 220A, 220B may be coupled to the network 210 via another type of high bandwidth connection.

Access nodes 230A-230E are coupled to the gateways 220A-B, either directly or indirectly, through connections 250, 260. For one embodiment, connections 250, 260 are wireless connections. For another embodiment, the connections may be wired connections, or other types of connections. For one embodiment, there are a certain number of first level access nodes 230, which are coupled directly 250 to gateways 220. Other access nodes 230 are coupled to the gateway 220 through one or more intermediate access nodes.

When a gateway 220 broadcasts a beacon, the beacon is received by all first-level access nodes. The beacon is used to establish a route from each access node to the gateway. First level access nodes are defined by the fact that they receive data directly from the gateway. The first level access nodes re-broadcast the beacon data, attaching their own data to it. This indicates to the second level access nodes that the path to the gateway includes the first level access node. This will be described in more detail below.

For one embodiment, the link quality of the beacon received determines whether that beacon is rebroadcast by the system. If the quality of the beacon is above a determined threshold, it is rebroadcast. Otherwise, it is not. For one embodiment, link quality is determined by persistence, i.e. the number of times in the last several routing cycles that the particular beacon was received. For one embodiment, the link quality reflects a reliability that a path to the gateway shown by the beacon will be available for a reasonable time. The link quality is determined by continuously monitoring the beacons as they are received in every cycle. Whenever the beacon is not received in a cycle, the link quality associated with that path is decreased. The beacon is only transmitted if its link quality is sufficiently high.

For another embodiment, the depth of re-broadcast is determined for the system. Thus, for example, an access node may rebroadcast a beacon only if there are 5 or fewer hops between the access node and the gateway. For another embodiment, other link quality factors, such as traffic congestion, battery status of upstream access nodes, thickness of the pipeline, backend (i.e. gateway) capacity, latency, or other factors may be used to determine whether the beacon should be rebroadcast.

After a beacon has been received by every access node, every access node has the address of an upstream access node, which leads to the gateway. For one embodiment, each access node also has a path to the gateway. A reverse beacon is then sent out through the access nodes, up to the gateway. The reverse beacon permits the gateway to establish a full access node tree, enabling the gateway to access all access nodes. Furthermore, the reverse beacon informs each access node what downstream nodes access the gateway through this access node.

Each access node has at least one upstream node, and may have a plurality of downstream nodes. Upstream nodes are the nodes that are between the access node and the gateway. For a level one access node, there is only one upstream node, the gateway. For a level four access node, there are four upstream nodes, which define the access node's path to the gateway. Downstream nodes are nodes that receive the beacon from a particular access node, and define their path to the gateway through that access node.

Although only a limited number of gateways 220 and access nodes 230 are shown in FIG. 2, it should be understood by one skilled in the art that an almost unlimited numbers of access nodes 220, at almost unlimited number of hops from the gateways 220 may be implemented. For one embodiment, the gateway capacity determines the number of access nodes that may be coupled to the gateway. Thus, for example, if the gateway can handle 10 simultaneous connections to various access nodes, then up to 100 access nodes may be coupled to the gateway. This indicates that no more than 1-in-10 access nodes access the gateway at any one time. This assures that the access nodes never have to wait for the gateway. Depending on the latency that is acceptable, which varies by function (e.g. voice v. data latency), the gateway may support a certain number of access nodes of each function.

The gateway plays a central role in the discovery of routes by the access nodes. At periodic intervals, the gateway originates a "beacon" which is broadcast to all access nodes within hearing range of the gateway. The time interval between successive broadcasts of the beacon defines a routing cycle. The beacon is a routing packet—a short data packet that contains the address of the gateway. For one embodiment, the beacon includes the following information: (1) a sequence number which identifies which routing cycle it initiates, 2) the address (MAC or IP) of the gateway, 3) a Traffic Monitoring Code (TMC). For one embodiment the TMC may be omitted. For one embodiment, the address of the gateway may be included only in the ethernet header or IP header of the beacon message.

For one embodiment, the gateway may add a hop-count counter set to 0. This hop point counter would be incremented by each access node that rebroadcasts the beacon. This permits the receiving access node to determine how many hops from the gateway it is.

For one embodiment, the beacon may contain only the sequence number of the message. All other relevant information may be captured in the ethernet-level header and/or IP headers of the message.

Figure 3:
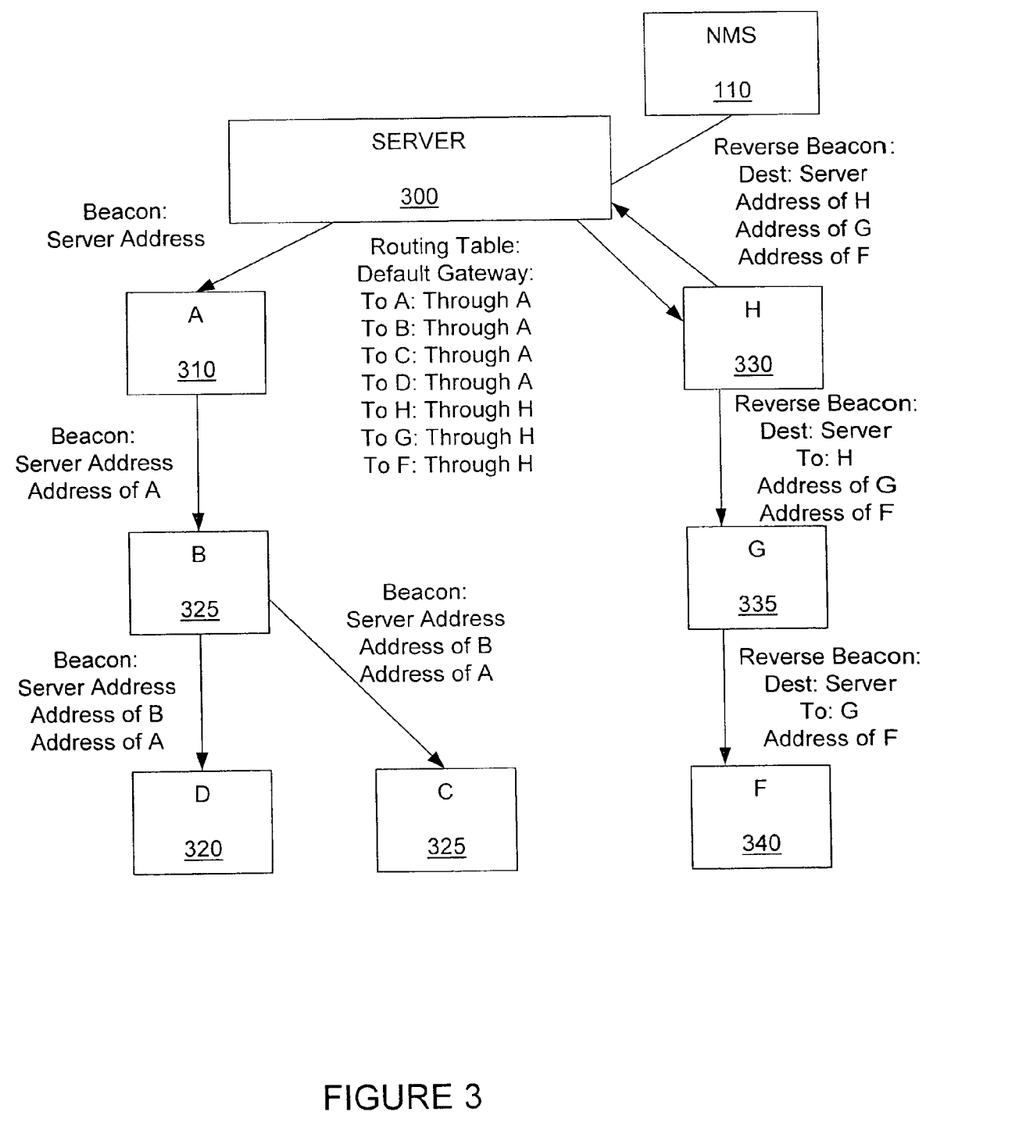
FIG. 3 shows a wireless network that can include beacons according to embodiments of the invention.

The beacon is received by all access nodes within direct receiving range of the gateway. For one embodiment, as shown in FIG. 3, this is shown as access nodes A 310 and H 330. For one embodiment, there is a means to ensure that the broadcast transmission is received. This will be discussed in more detail below. All such access nodes 310, 330, which are one hop from the gateway, are referred to as being at Level One with respect to the gateway 300.

On receipt of the beacon, each level one access node 310, 330 has a path to connect to the gateway 300. For one embodiment, each of the level one access nodes 310, 330 has the following data: (1) its connectivity to the gateway, (2) a means to gain access to the gateway (since it now knows the address of the gateway and can direct transmissions to it), 3) the TMC of the gateway. After a small delay, each Level One access node 310, 330 rebroadcasts the beacon, after appending to the beacon its own address and TMC. For one embodiment, the delay is a random delay, such that not all level one access nodes broadcast at the same time. For one embodiment, the TMC data may be omitted. For one embodiment, the access node may only increment a hop-count counter of the received beacon before rebroadcasting it. For another embodiment, the access node may rebroadcast the beacon unaltered.

For one embodiment, the rebroadcast beacon now contains (1) the sequence number, (2) the address of the gateway and its TMC, (2) the address of the Level One Access node and its TMC. Alternatively, the beacon may only include a hop-count, and/or a sequence number.

This beacon is now received by all access nodes that are two hops from the gateway (level two access nodes) 325, 335. On receipt of the beacon, each level two access node 325, 335 now knows, for one embodiment, (1) that it has connectivity to the gateway, (2) an explicit route to the next upstream access node (the level one access node whose broadcast it received), 3) the full path to the gateway through the upstream level one access node and 4) the TMCs of the gateway and the level one access node from whom the broadcast was received. For one embodiment, each level two access node now knows (1) that it has connectivity to the gateway and (2) an explicit route to the next upstream access node. For one embodiment, each level two access node knows the number of hops to the gateway 300 through the next upstream access node.

It may happen that a level two access node 325, 335 may receive beacon rebroadcast from two or more level one access nodes. In this case, it will select one of the two proffered routes, and reject the other(s). For one embodiment, the route that has the best link quality is selected. As described above, the link quality, for one embodiment, includes the persistence of the beacon. For one embodiment, it may further include other link quality factors.

Each access node at level two now rebroadcasts the beacon. For one embodiment, it rebroadcasts the beacon after having appended its address and TMC to the beacon. For one embodiment, it rebroadcasts the beacon after having incremented the hop-count of the path back to the gateway. For another embodiment, it rebroadcasts the beacon unaltered. As discussed above, this optimal path or optimal beacon may be selected based on link quality, priority in receiving the beacon, or based on another evaluation. By iteration of this process at each Level, each access node that has connectivity to the gateway (i.e., that can link to the gateway through functional links potentially mediated by other access nodes) becomes aware of its own connectivity to the gateway. For one embodiment, each access node knows a complete path to the gateway. For another embodiment, each access node knows only the next upstream access node on way to the gateway.

When the reverse beacon is received, the access node further learns all of the downstream access nodes whose routes to the gateway pass through this particular access node. For one embodiment, the access node also stores this information. For one embodiment the upstream and downstream paths are stored in a temporary memory. For one embodiment, the temporary memory is a route table. For another embodiment, the temporary memory may be a cache. It is to be noted that the size of the temporary memory is of the order of the number of access nodes connected to a particular access node downstream, and the data of the upstream access node which leads the access node to the gateway. For another embodiment, the data in the memory is the actual path to the gateway, and the size of the memory is of the order of the length of the path to the gateway (number of hops to the gateway). This is very small compared with traditional distance-vector protocols, link-state protocols, or their variants where the length of the routing table is of the order of the number of nodes (access nodes) in the network. For instance, assuming a uniform density of nodes, the size of the path that needs to be stored in a Access node's memory is of the order of the square root of N, where N is the number of nodes.

The above-described method illustrates how nodes in the network (access nodes) receive up-to-date information about their connectivity to the gateway and a means to reach the gateway.

In the system of FIG. 3, a reverse beacon is used to permit the gateway to receive data to set up a full (two-way) routing path. For one embodiment, the reverse beacon is sent when the gateway sends a dummy reverse beacon, initiating it. For another embodiment, the reverse beacon is initiated when the access node wishes to initiate communication with the gateway.

A Network Display Including Thresholds

Figure 4:
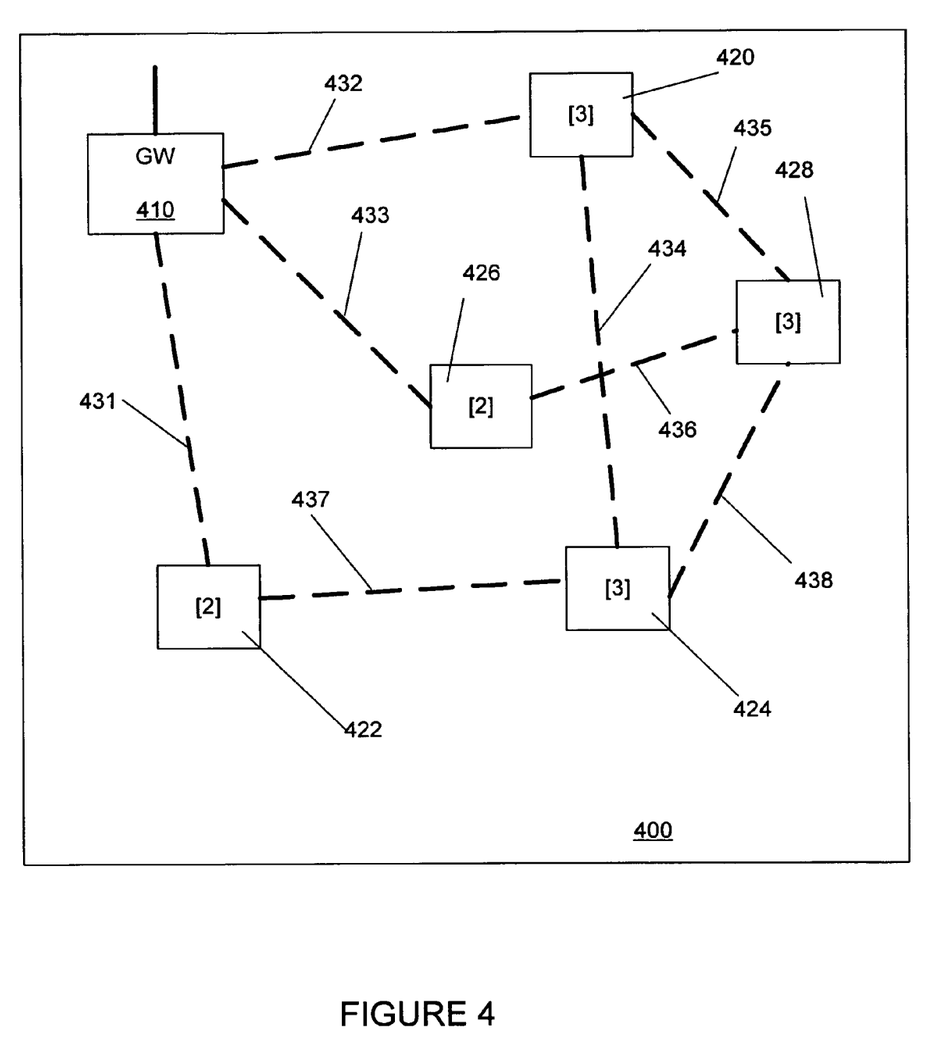
FIG. 4 shows an example of a display of information that can be used to convey network routing path information to a network manager according to an embodiment of the invention.

FIG. 4 shows an NMS display of a network that can be generated according to embodiments of the invention. The NMS display of FIG. 4 only includes a single cluster. It is to be understood that the NMS display can include multiple clusters, or only a subset of a cluster.

A gateway 410 includes a wired connection. Several access nodes 420, 422, 424, 426, 428 are wirelessly connected to the gateway 410 as previously described.

The NMS display provides information regarding the quality of links and paths associated with the access nodes 420, 422, 424, 426, 428 of the network. The NMS display can also include information regarding a redundancy of paths and links associated with the access nodes 420, 422, 424, 426, 428 of the network. Links of the network can be defined as direct wireless connections between neighboring access nodes, whereas a path can be defined as including all active links between an access node and a gateway.

Generally, the NMS receives information regarding the quality of the links and paths associated with the access nodes 420, 422, 424, 426, 428. An embodiment includes the NMS determining path metric values associated with the network, and displaying only the path metric values that fall within a predetermined set. The determination of path metric values by the NMS generally includes obtaining the path metric values from the access nodes of the network.

Determination of path metric values by the access nodes will be discussed in detail later. Generally, the path metric values provide an indication of the quality of transmission links and paths of the access nodes.

The NMS display 400 of FIG. 4, shows the access nodes 420, 422, 424, 426, 428 and the gateway 410. Additionally, links 431, 432, 433, 434, 435, 436, 437, 438 between the gateway 410 and the access nodes 420, 422, 424, 426, 428 are depicted. This NMS display is unique because only links having a link quality (as described later) are shown in the NMS display 400. For example, a transmission link may exist between access node 426 and access node 420 or between the gateway 410 and access node 424, but these links do not show up on the NMS display 400 because the links do fall within a required predetermined set.

Displaying links and paths having a certain level of quality, allows a network manager to view the display and make educated decisions of how the maintain or improve the performance of the network.

Predetermined Set Selection

The predetermined set of values can include a predetermined threshold, and only paths and links having path metric values greater than the threshold are displayed. However, the invention is not to be limited to this particular case. The predetermined set of values can include an upper threshold or a lower threshold.

The predetermined set of the NMS display 400 can be initialized to a default value. The default value can be predefined according to a criteria, or by a network manager. The predetermined set can then be modified by a network manager who is viewing the NMS display 400. Modifications to the predetermined set can be fed back to the NMS, for example, through a tool bar, a mouse or a computer keyboard.

An embodiment includes the predetermined set being dependent upon a redundancy of the links and paths associated with an access node that meet the predetermined set. That is, if a large number of paths associated with an access node meet a first predetermined set, then the predetermined set can be modified to a second predetermined set requiring even higher quality paths to be displayed.

Another embodiment includes the predetermined set of paths being dependent upon the actual use of the access nodes. For example, a service provider network can require different network performance than a private network. The service provider network may desire less redundancy and greater throughput, and therefore, desire a greater predetermined set when observing the paths and links of the network. A private network may desire high redundancy and lower throughput, and therefore, desire a lower predetermined set when observing the paths and links of the network. A network that transfers primarily video (high bandwidth) information may desire a high predetermined set, whereas a network that transfers primarily audio (low bandwidth) information may desire a low predetermined set.

Another embodiment can include the predetermined set for each link or path being individually adjustable by a network manager. Different access nodes may require different levels of link quality.

Node Redundancy

The redundancy of an access node can be a useful parameter for a network manager. The redundancy of an access node provides an indication of how many paths of an access node have a quality that exceeds the threshold level. For example, an access node that has 3 paths that exceed the threshold level is more redundant than an access node that has 2 paths that exceed the threshold level.

An embodiment include the NMS display 400 providing a representation of the redundancy of each access node. For example, access nodes 420, 424, 428 of FIG. 4 includes a number 3 within the node to designate the number of paths of the access nodes 420, 424, 428 that have a quality value that exceeds the threshold. Another embodiment includes the NMS display 400 only showing an access node if the redundancy of the access node meets a predetermined level. For example, the display of FIG. 4 could be configured so that the access nodes 420, 422, 424, 426, 428 are only depicted if the access node have redundancy greater that the predetermined level of number, for example, 2.

Display Depiction of Network Parameters

As described above, the invention can include depicting paths and links of the network that fall within a predetermined set. The display can also include a depiction of the redundancy, a default path and even links and paths that have quality parameters (metric values) below the predetermined set. The default routing path is a previously determined optimal route.

All that is required is that the various types of paths and links be distinguishable from each other on the display. For example, paths having quality parameters greater than the threshold could be a first color, default paths could be a second color, and paths having a quality parameter less than the threshold could be a third color.

Figure 5:
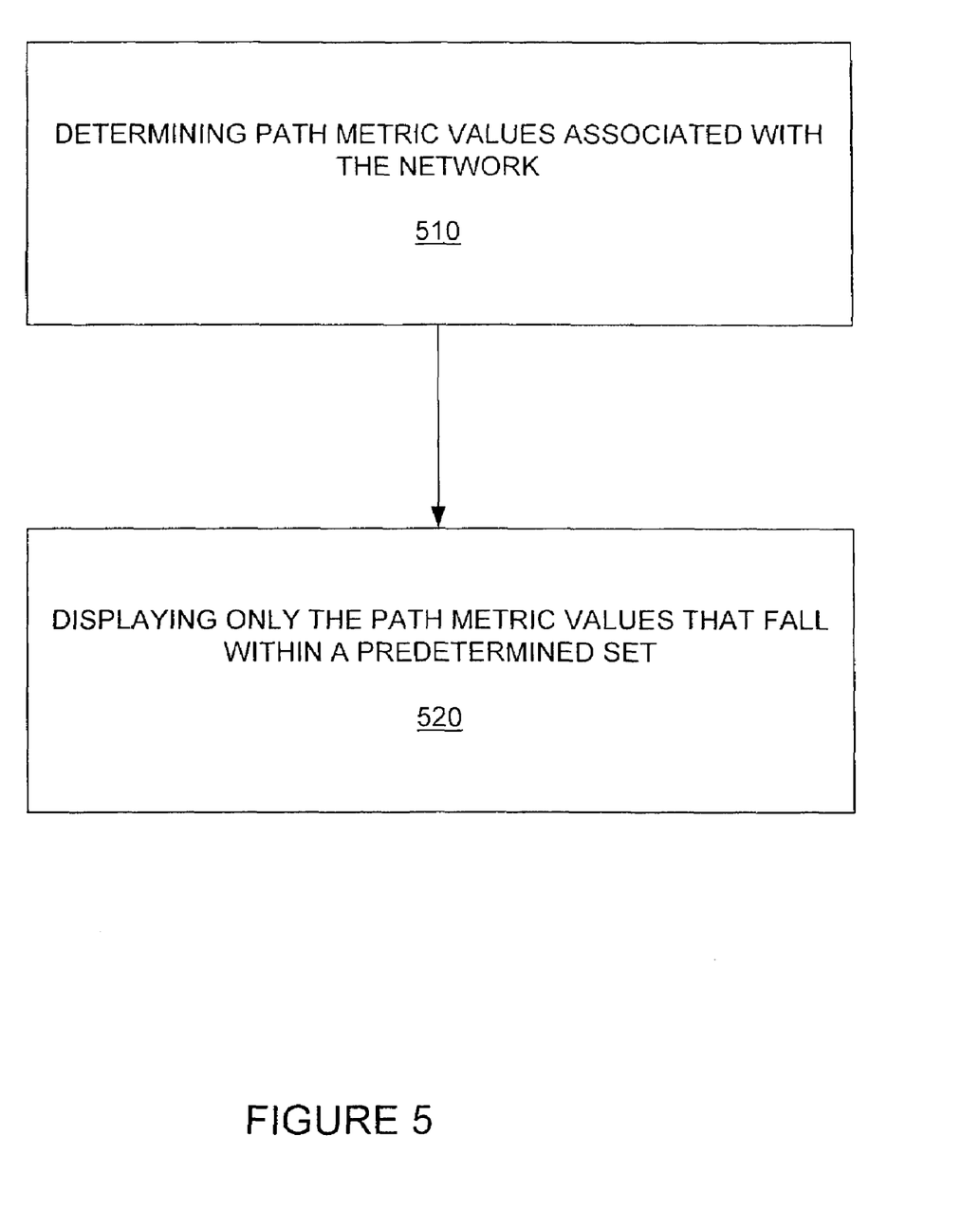
FIG. 5 is a flow chart showing acts according to an embodiment of the invention.

FIG. 5 is a flow chart showing acts included within an embodiment of the invention. The acts can be included within software operating within a network manager. The quality of links and paths within the network are generally determined and stored within the network. The acts provide a method of displaying path metrics associate with nodes and links within a network.

A first act 510 includes determining path metric values associated with the network A second act 520 includes displaying only the path metric values that exceed a predetermined set. As previously described, the predetermined set can be adjustable by a network manager. The predetermined set can include an initial default value, wherein the initial default value can be adjusted by a network manager. The predetermined set associated with a particular node can be based upon a redundancy of paths available to the particular node.

As previously described, other embodiments include each node of the network including a node predetermined set that can be individually adjusted for each node. A network manager can be allowed to adjust each of the node predetermined sets. Other embodiments include the node predetermined set of each node being at least partially dependent upon a use of a corresponding node.

Path Quality Determination

The path quality determination can include receiving routing packets at the access node through at least one wireless route. Each routing packet including route information that identifies the wireless route of the routing packet. Various methods can be used to determine path and link quality for the routing packets. An embodiment includes determining path metric values associated with the network by determining a success ratio of a number routing packets successfully received at a node, versus a number of transmitted routing packets over a period of time T1, for each wireless route to the node. The routing packets are beacons. Generally, the beacons are initially transmitted by at least one gateway. Generally, a predetermined number of routing packets are transmitted from at least one gateway over a unit of time. The beacons can be transmitted according to an 802.11 protocol.

Another embodiment includes determining path metric values associated with the network by determining a success long ratio of a number of routing packets successfully received by a node versus a number of transmitted routing packets over a period of time T2, wherein T2 is substantially greater than T1, for each node.

Another embodiment includes determining path metric values associated with each node of the network by determining a throughput, for each node. Throughput determination can include determining a number of wireless hops for each node.

Another embodiment includes determining path metric values by determining a variability of each path.

Other embodiments include determining path metric values by determining at least one of SNR, BER, PER of signals transmitted between nodes of the network.

Beacon packets are periodically generated at gateways so that within a fixed time interval there is a fixed number of transmitted beacons. The beacons advertise routing paths, and can be received by any access node. The beacons can be lost at any point in a wireless network due to link failures or fading. As the beacons travel through the network by way of rebroadcasts at access nodes, the packet losses (of the beacons) are cumulative. As a result, the number of beacons received at an access node advertising a particular path is generally less than the ideal (loss-less) number of beacons that could possibly be received.

The access nodes can include logic for analyzing the number of beacons received that advertise each of the possible routing paths. This analysis, which generally takes into account the fraction of beacons successfully received for each possible path, on a multiplicity of time scales, determines which of the available paths is the "best" or "optimal" path. Essentially, a routing decision is made. The routing decision of an access node, selects the default gateway of the access node to be the next hop along the selected path. The result is that routes set up through the wireless network correspond to the set of selected optimal paths.

The path logic of the path quality determination uses reception versus loss of path identifying beacons to characterize the end-to-end path from a wired gateway to each access node. The path selection of each of the access nodes consists of one or more screening processes in which the paths with the best availability, consistency and/or throughput are selected. After the screening processes, an optimal path can be selected.

A first path quality determination generally includes identifying all of the available paths. Each of the possible paths is identified and tracked to determine properties of the path.

A second path quality determinations can include determining an availability of each path. Among all of the possible paths, some paths can become unavailable due to links becoming unusable. If this condition happens to a path, it can be detected on the basis of recent history, and the path can be eliminated. This availability detection is time critical. This determination can be designated as the availability test or short test (due to the short time period of the test).

A third path quality test can include determining a consistency of each path. Among the paths that have passed the availability screening test, additional screening can include determining paths that have a consistent throughput. Consistency can be defined in terms of variation in latency across a path or equivalently by a ratio of standard deviation to mean for an expected throughput of the path.

Paths that are determined not to be consistent are discarded (screened out). This test can be referred to as the "consistency test" or the "long test." This test is important for maintaining end-to-end throughput because, for example, TCP (and therefore, applications using TCP as a transmission protocol) is very sensitive to jitter. A TCP rate control algorithm reacts adversely to variable latency and path quality, and can even lock up in some cases. In comparison to the availability (short) test, the consistency (long) test is not as sensitive to brief link outages. However, the consistency test can be strongly correlated with both an observed throughput and a perceived availability by the end user due to fluctuations in the throughput. Generally, it is necessary to take a sufficiently long time interval of history in order to make an accurate assessment of consistency (therefore, the name "long test").

A fourth path quality test can include determining a throughput of each path. Generally, once the availability and consistency tests have pre-screened the paths, a path having a maximal expected throughput is selected to maximize the performance of the network. This selection includes a "throughput" test, which will be described. Effects such as self-interference and packet loss impact expected throughput.

An embodiment includes the routing packets being beacons. Generally, the beacons are initially transmitted by at least one gateway. An embodiment includes the beacons being transmitted according to an 802.11 protocol. Generally, a predetermined number of routing packets (beacons) are transmitted from at least one gateway over a unit of time.

An optimal path selection can be influenced by the default path. The default path is generally defined as the previously selected path. The default path can be given extra consideration as a future selected path. If the default path is among the paths that pass through the screening of the desired paths, generally, the default path is re-selected as the optimal path.

Recommendations and Advice Provided by the NMS

The NMS can provide more than just observed performance of the network. The NMS can also provide suggestions to a network manager for improving performance of the network. The NMS display can include providing suggestions to a network manager of better locations of the nodes to improve performance of the network. Providing suggestions to the network manager of better locations of the nodes to improve performance of the network can include recommending nodes that include a poor link be moved closer to each other.

The NMS display can include providing suggestions to a network manager of new locations of additional nodes to improve performance of the network. Providing suggestions to the network manager of new locations of additional nodes to improve performance of the network can include recommending additional nodes between nodes that include a poor link.

Although specific embodiments of the invention have been described and illustrated, the invention is not to be limited to the specific forms or arrangements of parts so described and illustrated. The invention is limited only by the appended claims.

What is claimed:

1. A method of displaying path metrics associate with nodes and links within a wireless mesh network, comprising:
   determining path metric values associated with the wireless mesh network, wherein the path metric values provide an indication of a transmission link qualities and path qualities; wherein determining path metric values comprises;
   gateways of the network originating routing beacons;
   access nodes receiving and monitoring the routing beacons, the access nodes determining a link quality and path quality associated with the received routing beacons based on the routing beacons, the access nodes retransmitting modified routing beacons if the path quality is above a threshold;
   a network management system receiving the transmission link qualities and the transmission path qualities from each of the access nodes;
   visually displaying on a display of the network management system observable by a network manager, only the path metric values that fall within a predetermined range, wherein the predetermined range is adjustable.

2. The method of claim 1, wherein the predetermined range comprises values greater than a threshold value.

3. The method of claim 1, wherein the predetermined range is adjustable by a network manager.

4. The method of claim 1, wherein the predetermined range comprises an initial default value, wherein the predetermined range can be additionally adjusted by a network manager.

5. The method of claim 1, wherein the predetermined range associated with a particular node is based upon a redundancy of paths available to the particular node.

6. The method of claim 5, wherein the redundancy of paths of a node is determined by a number of paths associated with the node that have path metric values that fall within the predetermined range.

7. The method of claim 1, wherein each node of the network includes a node predetermined range that can be individually adjusted for each node.

8. The method of claim 7, wherein a network manager can adjust each of the node predetermined ranges.

9. The method of claim 7, wherein each node predetermined range is at least partially dependent upon a use of a corresponding node.

10. The method of claim 1, further comprising displaying representation of a redundancy of paths associated each node.

11. The method of claim 10, wherein only nodes having a threshold number of redundant paths are distinguishably displayed.

12. The method of claim 1, wherein determining path metric values associated with the network comprises determining a success ratio of a number of routing beacons successfully received at a node, versus a number of transmitted routing beacons over a period of time T1, for each wireless route to each node.

13. The method of claim 12, wherein determining path metric values associated with the network further comprises determining a success long ratio of a number of routing beacons successfully received by a node versus a number of transmitted routing beacons over a period of time T2, wherein T2 is substantially greater than T1, for each node.

14. The method of claim 1, wherein determining path metric values associated with each node of the network further comprises determining a throughput, for each node.

15. The method of claim 1, wherein determining path metric values comprises determining a variability of each path.

16. The method of claim 1, further comprising providing suggestions to a network manager of better locations of the nodes to improve performance of the network.

17. The method of claim 16, wherein providing suggestions to the network manager of better locations of the nodes to improve performance of the network comprises recommending nodes that include a poor link be moved closer to each other.

18. The method of claim 1, further comprising providing suggestions to a network manager of new locations of additional nodes to improve performance of the network.

19. The method of claim 18, wherein providing suggestions to the network manager of new locations of additional nodes to improve performance of the network comprises recommending additional nodes between nodes that include a poor link.

* * * * *